(12) United States Patent
Salter et al.

(10) Patent No.: US 11,945,502 B2
(45) Date of Patent: Apr. 2, 2024

(54) SYSTEMS AND METHODS FOR PROVIDING STEERING ASSISTANCE WHEN PARKING DURING ELECTRIFIED VEHICLE TOWING EVENTS

(71) Applicant: FORD GLOBAL TECHNOLOGIES, LLC, Dearborn, MI (US)

(72) Inventors: Stuart C. Salter, White Lake, MI (US); Kenneth Patrick McHugh, Canton, MI (US); Peter Phung, Windsor (CA); David Brian Glickman, Southfield, MI (US); Paul Kenneth Dellock, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 283 days.

(21) Appl. No.: 17/331,221

(22) Filed: May 26, 2021

(65) Prior Publication Data
US 2022/0379960 A1 Dec. 1, 2022

(51) Int. Cl.
*B62D 15/02* (2006.01)
*B60K 6/28* (2007.10)
*B60L 53/50* (2019.01)
*G01S 19/01* (2010.01)

(52) U.S. Cl.
CPC ............ *B62D 15/027* (2013.01); *B60L 53/50* (2019.02); *G01S 19/01* (2013.01); *B60K 6/28* (2013.01); *B60L 2260/20* (2013.01); *B60Y 2200/91* (2013.01); *B60Y 2200/92* (2013.01); *B60Y 2300/91* (2013.01)

(58) Field of Classification Search
CPC .... B62D 15/027; B62D 15/0285; B62D 6/00; B62D 5/0409; B62D 12/02; G01S 19/01; B60L 53/50; B60L 2260/20; B60L 2240/30; B60L 2240/642; B60K 6/28; B60Y 2200/91; B60Y 2300/91; B60W 2510/20; B60W 10/20
See application file for complete search history.

(56) References Cited

U.S. PATENT DOCUMENTS

| 5,295,551 | A | * | 3/1994 | Sukonick | B62D 1/28 180/167 |
|---|---|---|---|---|---|
| 8,849,518 | B2 | | 9/2014 | Nefcy et al. | |
| 9,527,394 | B1 | | 12/2016 | Tang et al. | |
| 11,623,637 | B2 | * | 4/2023 | Salter | B60R 1/00 340/932.2 |

(Continued)

FOREIGN PATENT DOCUMENTS

GB 2574384 A 12/2019

*Primary Examiner* — James M McPherson
*Assistant Examiner* — Kyle J Kingsland
(74) *Attorney, Agent, or Firm* — David B Kelley; Carlson, Gaskey & Olds, P.C.

(57) ABSTRACT

Systems and methods for coordinating steering controls between towing vehicles and towed vehicles provide more cohesive parking experiences during towing events, including bidirectional charging towing events. The towed vehicle may be controlled to provide assistive parking steering maneuvers to assist the towing vehicle when parking during the towing event. The assistive parking steering maneuver may include maneuvering a drive wheel of the towed vehicle either toward or away from a detected curb or detected traffic, for example.

16 Claims, 9 Drawing Sheets

(56) References Cited

U.S. PATENT DOCUMENTS

| | | | |
|---|---|---|---|
| 2009/0032273 A1* | 2/2009 | Hahn | B62D 13/005 |
| | | | 172/2 |
| 2017/0129536 A1 | 5/2017 | Xu et al. | |
| 2018/0113476 A1* | 4/2018 | Giles | G05D 1/0295 |
| 2020/0398823 A1* | 12/2020 | Oba | B62D 53/00 |
| 2022/0281522 A1* | 9/2022 | Robertson | B60D 1/62 |

\* cited by examiner

SYSTEMS AND METHODS FOR PROVIDING STEERING ASSISTANCE WHEN PARKING DURING ELECTRIFIED VEHICLE TOWING EVENTS

TECHNICAL FIELD

This disclosure is directed to vehicle systems and methods for coordinating steering controls when parking during vehicle-to-vehicle towing events.

BACKGROUND

Electrified vehicles differ from conventional motor vehicles because they are selectively driven by one or more traction battery pack powered electric machines. The electric machines can propel the electrified vehicles instead of, or in combination with, an internal combustion engine. Plug-in type electrified vehicles include one or more charging interfaces for charging the traction battery pack. Plug-in type electrified vehicles are typically charged while parked at a charging station or some other utility power source.

SUMMARY

A vehicle-to-vehicle in-flight energy transfer system, according to an exemplary aspect of the present disclosure includes, among other things, a towing vehicle, a towed vehicle, and a control module programmed to coordinate parking steering maneuvers of the towing vehicle and the towed vehicle when parking during a towing event between the towing vehicle and the towed vehicle.

In a further non-limiting embodiment of the foregoing system, the towing vehicle is a smaller vehicle than the towed vehicle.

In a further non-limiting embodiment of either of the foregoing systems, the towed vehicle is coupled to the towing vehicle by a towing device during the towing event in which the parking steering maneuvers are requested.

In a further non-limiting embodiment of any of the foregoing systems, the towing event is an in-flight bidirectional charging towing event.

In a further non-limiting embodiment of any of the foregoing systems, the control module is a component of the towing vehicle.

In a further non-limiting embodiment of any of the foregoing systems, the control module is programmed to transmit a steering request signal to the towed vehicle when parking during the towing event.

In a further non-limiting embodiment of any of the foregoing systems, the steering request signal includes steering-related data associated with the towing vehicle for instructing the towed vehicle to match a drive wheel turn direction of the towing vehicle.

In a further non-limiting embodiment of any of the foregoing systems, the steering related data includes at least a yaw rate and a steering wheel angle of the towing vehicle.

In a further non-limiting embodiment of any of the foregoing systems, the control module is programmed to command the towed vehicle to engage a parking brake when parking during the towing event.

In a further non-limiting embodiment of any of the foregoing systems, as part of coordinating the parking steering maneuvers, the control module is programmed to instruct a user of the towing vehicle to turn a first set of drive wheels in a first direction toward a curb when parking on a downhill grade of a roadway and command the towed vehicle to turn a second set of drive wheels of the towed vehicle in the first direction.

In a further non-limiting embodiment of any of the foregoing systems, as part of coordinating the parking steering maneuvers, the control module is programmed to instruct a user of the towing vehicle to turn a first set of drive wheels in a first direction away from a curb when parking on an uphill grade of a roadway and command the towed vehicle to turn a second set of drive wheels of the towed vehicle in the first direction.

In a further non-limiting embodiment of any of the foregoing systems, as part of coordinating the parking steering maneuvers, the control module is programmed to instruct a user of the towing vehicle to turn a first set of drive wheels in a first direction away from a traffic side of the towing vehicle when parking on a minimal grade of a roadway and command the towed vehicle to turn a second set of drive wheels of the towed vehicle in a second direction that is opposite of the first direction.

In a further non-limiting embodiment of any of the foregoing systems, the control module is programmed to analyze inputs from a shift device, a sensor system, a global positioning system (GPS), and a steering system of the towing vehicle for coordinating the parking steering maneuvers.

An electrified vehicle according to another exemplary aspect of the present disclosure includes, among other things, a drive wheel, a steering system for electronically steering the drive wheel, and a control module programmed to control the steering system for steering the drive wheel to a desired position in response to receiving a steering request signal when parking during a towing event.

In a further non-limiting embodiment of the foregoing electrified vehicle, the steering request signal is received from a second electrified vehicle.

In a further non-limiting embodiment of either of the foregoing electrified vehicles, a telecommunications module is configured for establishing bidirectional communications between the electrified vehicle and the second electrified vehicle.

In a further non-limiting embodiment of any of the foregoing electrified vehicles, the control module is a component of the electrified vehicle being towed during the towing event.

In a further non-limiting embodiment of any of the foregoing electrified vehicles, the steering request signal includes steering-related information received from a second electrified vehicle that is coupled to the electrified vehicle during the towing event.

In a further non-limiting embodiment of any of the foregoing electrified vehicles, the control module is programmed to communicate a steering command signal to the steering system for commanding the steering system to turn the drive wheel in either a same direction or in an opposite direction as a second drive wheel of a second electrified vehicle in response to receiving the steering request signal.

A method according to another exemplary aspect of the present disclosure includes, among other things, during a towing event in which a towing vehicle is towing a towed vehicle, controlling the towed vehicle to provide a parking steering maneuver when parking the towed vehicle and the towing vehicle during the towing event.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure is directed to systems and methods for coordinating steering controls between towing vehicles and towed vehicles in order to provide more cohesive parking experiences during towing events, including towing events associated with in-flight bidirectional charging. The towed vehicle may be controlled to provide assistive parking steering maneuvers to assist the towing vehicle when parking during the towing event. The assistive parking steering maneuver may include maneuvering a drive wheel of the towed vehicle either toward or away from a detected curb or detected traffic, for example. These and other features of this disclosure are discussed in greater detail in the following paragraphs of this detailed description.

Figure 1:
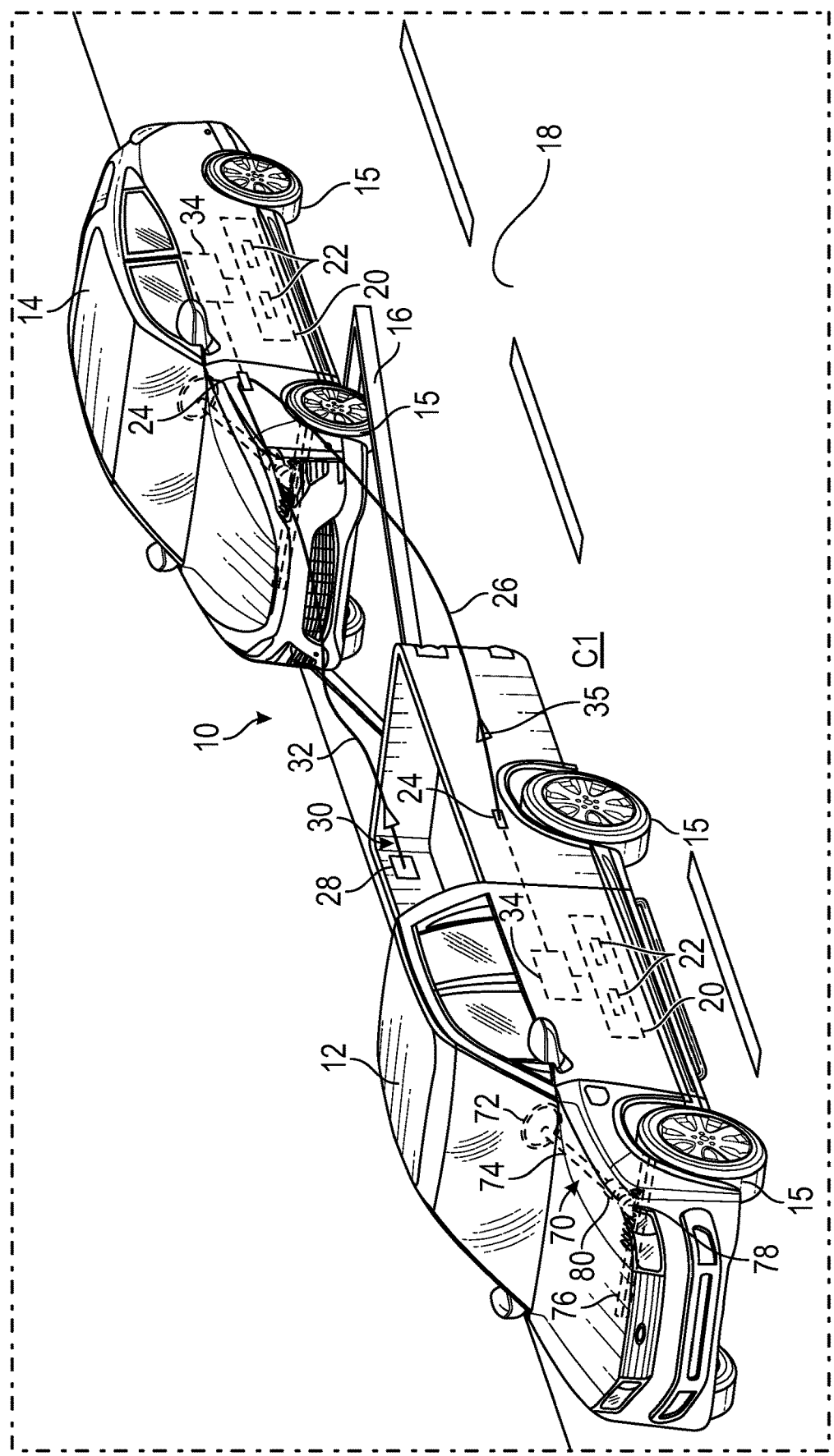
FIG. 1 schematically illustrates a first in-flight configuration of a vehicle-to-vehicle energy transfer system during a towing event.
Figure 2:
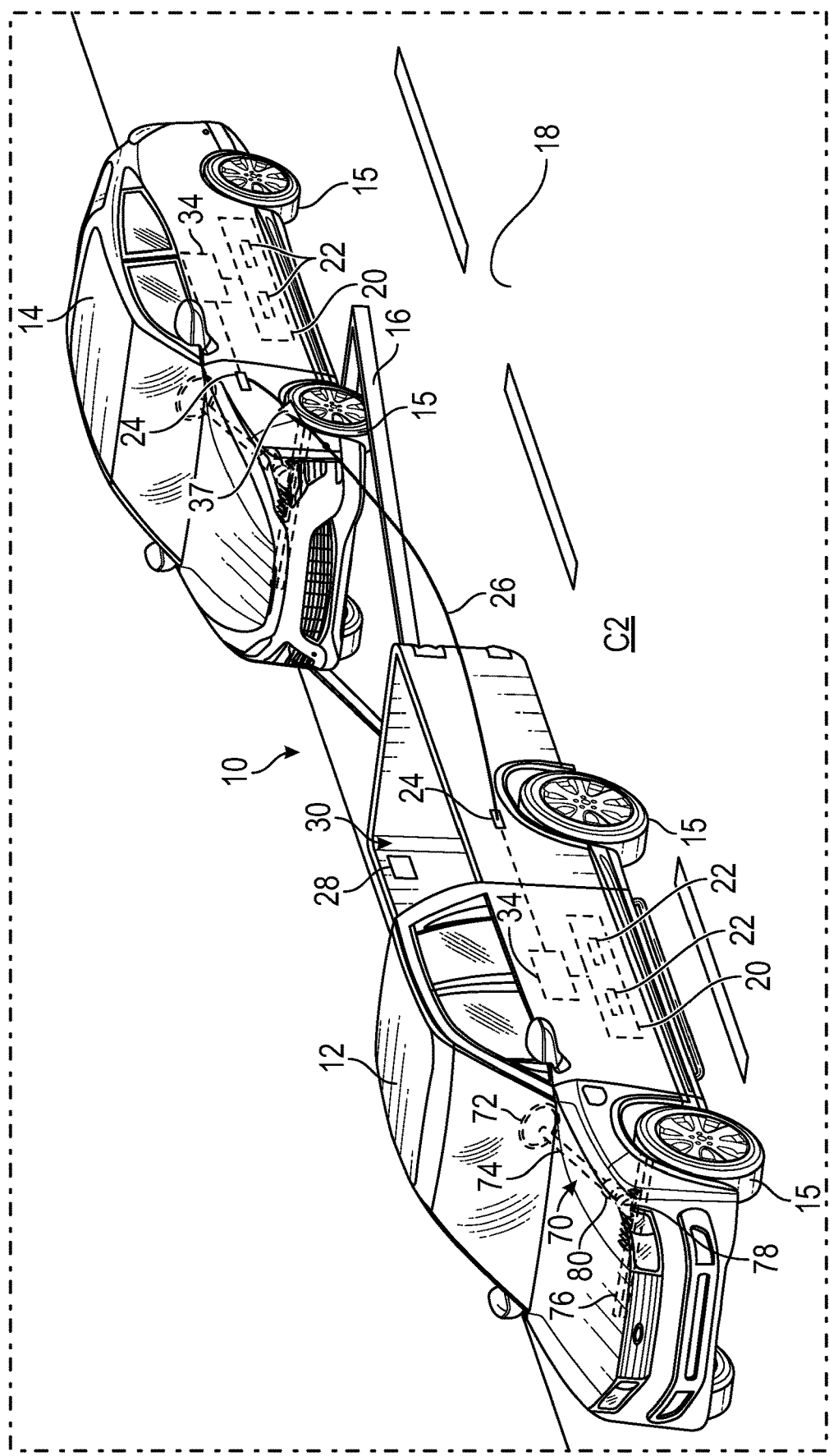
FIG. 2 schematically illustrates a second in-flight configuration of the vehicle-to-vehicle energy transfer system of FIG. 1.

FIGS. 1 and 2 schematically illustrate an exemplary vehicle-to-vehicle (V2V) in-flight energy transfer system 10 (hereinafter "the system 10") for bidirectionally transferring energy between a towing or leading vehicle 12 and a towed or trailing vehicle 14 during a towing event. In this disclosure, the term "in-flight" means during the coupled movement of the leading vehicle 12 and the trailing vehicle 14. Accordingly, the system 10 enables the bidirectional transfer of energy from the leading vehicle 12 to the trailing vehicle 14 or vice-versa while the leading and trailing vehicles 12, 14 are coupled together and making forward progress toward their desired destinations.

Although a specific component relationship is illustrated in the figures of this disclosure, the illustrations are not intended to limit this disclosure. The placement and orientation of the various components of the depicted vehicles are shown schematically and could vary within the scope of this disclosure. In addition, the various figures accompanying this disclosure are not necessarily drawn to scale, and some features may be exaggerated or minimized to emphasize certain details of a particular component or system.

The in-flight energy transfer afforded by the system 10 is beneficial to both participating parties. For example, the user/owner of the trailing vehicle 14 may take advantage of the time while being towed by resting, sleeping, eating, working, etc., and the user/owner of the leading vehicle 12 may generate income for performing the towing/charging task (e.g., revenue opportunity).

A towing device 16 may releasably couple the trailing vehicle 14 relative to the leading vehicle 12 to allow the leading vehicle 12 to pull the trailing vehicle 14 along a roadway 18 and thus control driving of the trailing vehicle 14 during a towing event. The towing device 16 could by any type of towing device. Accordingly, the specific configuration of the towing device 16 is not intended to limit this disclosure.

In an embodiment, the leading vehicle 12 and the trailing vehicle 14 are both plug-in type electrified vehicles (e.g., a plug-in hybrid electric vehicle (PHEV) or a battery electric vehicle (BEV)). Each of the leading and trailing vehicles 12, 14 includes a traction battery pack 20. The leading vehicle 12 and the trailing vehicle 14 may each include an electrified powertrain capable of applying a propulsive torque from an electric machine (e.g., an electric motor) for driving drive wheels 15 of the leading and trailing vehicles 12, 14. Therefore, the powertrain of each of the leading vehicle 12 and the trailing vehicle 14 may electrically propel the respective set of drive wheels 15 either with or without the assistance of an internal combustion engine.

Although shown schematically, each traction battery pack 20 may be configured as a high voltage traction battery pack that includes a plurality of battery arrays 22 (i.e., battery assemblies or groupings of battery cells) capable of outputting electrical power to one or more electric machines of each vehicle. Other types of energy storage devices and/or output devices may also be used to electrically power each of the leading vehicle 12 and the trailing vehicle 14.

From time to time, charging the energy storage devices of the traction battery pack 20 of each of the leading vehicle 12 and the trailing vehicle 14 may be required or desirable. Each of the leading and trailing vehicles 12, 14 may therefore be equipped with a charging system that includes a charge port assembly 24. A charge cable 26 (e.g., EVSE) may be connected to the corresponding charge port assemblies 24 of the leading and trailing vehicles 12, 14 in order to transfer charge energy from the traction battery pack 20 of the leading vehicle 12 or the trailing vehicle 14 to the traction battery pack 20 of the other of the leading vehicle 12 or the trailing vehicle 14. The charge cable 26 may be configured to provide any level of charging (e.g., Level 1 AC charging, Level 2 AC charging, DC charging, etc.).

The charging system of the leading vehicle 12 could optionally be equipped with a secondary charge port assembly 28. In an embodiment, the secondary charge port assembly 28 is mounted within a cargo space 30 of the leading vehicle 12 for providing access to a power source at an external location of the leading vehicle 12. A charge cable 32 may be connected to the secondary charge port assembly 28 and the charge port assembly 24 of the trailing vehicle 14 in order to transfer charge energy from the traction battery pack 20 of one of the leading vehicle 12 or the trailing vehicle 14 to the traction battery pack 20 of the other of the leading vehicle 12 or the trailing vehicle 14. The charge cable 32 may be configured to provide Level 1 or Level 2 AC charging, for example. In another embodiment, energy can be transferred between the leading and trailing vehicles 12, 14 using both the charge cable 26 and the charge cable 32. Although not specifically shown, the leading vehicle 12 and/or the trailing vehicle 14 could be equipped with one or more additional charging interfaces.

The respective charging systems of the leading and trailing vehicles 12, 14 may additionally include a bidirectional power transfer system 34 configured for enabling the bidirectional transfer of power between the vehicles 12, 14. The bidirectional power transfer system 34 may be operably connected between the charge port assembly 24 and the traction battery pack 20 of each of the leading vehicle 12 and the trailing vehicle 14. The bidirectional power transfer system 34 may include various equipment, such as a charger, a converter, a motor controller (which may be referred to as an inverter system controller or ISC), etc., arranged and configured to establish the bidirectional transfer of electrical energy between the respective traction battery packs 20 of the leading and trailing vehicles 12, 14. The bidirectional power transfer systems 34 may additionally be configured to transfer energy between the traction battery packs 20 and the electric machines of each respective vehicle 12, 14.

One non-limiting example of a suitable bidirectional power transfer system that may be employed for use within the leading vehicle 12 and/or the trailing vehicle 14 for achieving bidirectional power transfers is disclosed within US Patent Publication No. 2020/0324665, assigned to Ford Global Technologies, LLC, the disclosure of which is incorporated by reference herein. However, other bidirectional power transfer systems could also be utilized for achieving the bidirectional transfer of power between the leading and trailing vehicles 12, 14 within the scope of this disclosure.

FIG. 1 schematically illustrates a first in-flight configuration C1 of the system 10. During the first in-flight configuration C1, power may be transferred from the traction battery pack 20 of the leading vehicle 12 to the traction battery pack 20 of the trailing vehicle 14 (as schematically depicted by arrow 35).

FIG. 2 schematically illustrates a second in-flight configuration C2 of the system 10. During the second in-flight configuration C2, power may be transferred from the traction battery pack 20 of the trailing vehicle 14 to the traction battery pack 20 of the leading vehicle 12 (as schematically illustrated by arrow 37). In this way, the trailing vehicle 14 may charge the leading vehicle 12 during the in-flight towing and charging event, such as for increasing the towing distance that the leading vehicle 12 is capable of towing the trailing vehicle 14.

The teachings of this disclosure may be applicable for any type of vehicle as the leading vehicle 12 and for any type of vehicle as the trailing vehicle 14. For example, the leading vehicle 12 or the trailing vehicle 14 could be configured as a car, a truck, a van, a sport utility vehicle (SUV), etc.

The leading vehicle 12 of FIGS. 1-2 is schematically illustrated as a pickup truck, and the trailing vehicle 14 of FIGS. 1-2 is schematically illustrated as a car. Thus, the trailing vehicle 14 is the smaller of the two vehicles in the embodiment of FIGS. 1-2. However, the leading vehicle 12 could alternatively be configured as the smaller of the two vehicles, and the trailing vehicle 14 could be configured as the larger of the two vehicles (see, e.g., the embodiment of FIG. 3).

Each of the leading and trailing vehicles 12, 14 may additionally be equipped with a steering system 70 for controlling the steering of each respective vehicle. In an embodiment, each steering system 70 is part of an electric power assisted system (EPAS). In another embodiment, the steering system 70 is part of a steer-by-wire system. However, other types of steering systems are also contemplated within the scope of this disclosure.

Each steering system 70 may include, among other things, a steering wheel 72, a steering shaft 74, and a steering rack 76 that is operably connected to the drive wheels 15. In an embodiment, the steering wheel 72 may be mechanically coupled to the steering shaft 74. In another embodiment, the steering wheel 72 and the steering shaft 74 are not mechanically linked, such as for steer-by-wire configurations.

A pinion gear 78 of the steering shaft 74 may operably engage the steering rack 76 in order to move the steering rack 76 in response to rotating the steering wheel 72. Motion of the steering wheel 72 may thus be transferred to the drive wheels 15 for steering the respective vehicle 12, 14.

The steering systems 70 may additionally include one or more electric motors 80 that are operably connected to either the steering shaft 74 or the steering rack 76. The electric motor(s) 80 may be selectively controlled to apply power to the steering system 70, such as to control steering of the vehicle or to assist the driver in turning the steering wheel 72 in a desired direction. For example, an output shaft of the electric motor 80 may turn in the same direction as the steering wheel 72 in order to assist the turning motion of the steering wheel 72 as part of an EPAS.

Figure 3:
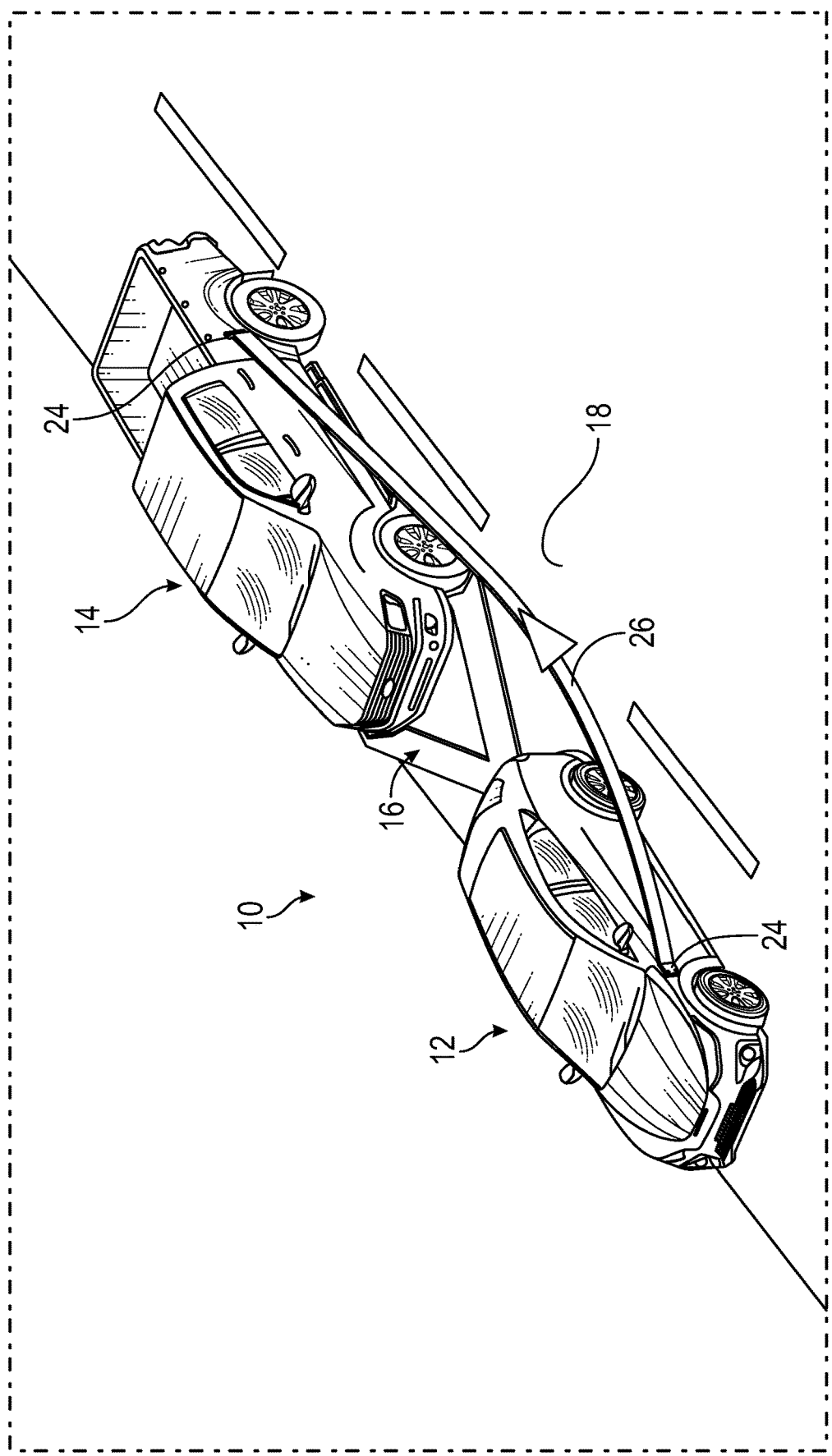
FIG. 3 schematically illustrates another towing event of a vehicle-to-vehicle energy transfer system.

In any of the scenarios depicted in FIGS. 1-3, the leading vehicle 12 could potentially require steering assistance from the trailing vehicle 14 for better maneuvering the coupled movement of the vehicles 12, 14 during select portions of the towing event. Coordination of steering controls between the leading vehicle 12 and the trailing vehicle 14 may be particularly beneficial when parking the coupled vehicles during the towing event. The trailing vehicle 14 may therefore be controlled to provide assistive parking steering maneuvers (e.g., by automatically controlling the steering system 70 of the trailing vehicle 14) when parking during the towing event. This disclosure therefore describes exemplary embodiments for coordinating steering controls between the leading vehicle 12 and the trailing vehicle 14 in order to provide more cohesive parking experiences during towing events.

Figure 4:
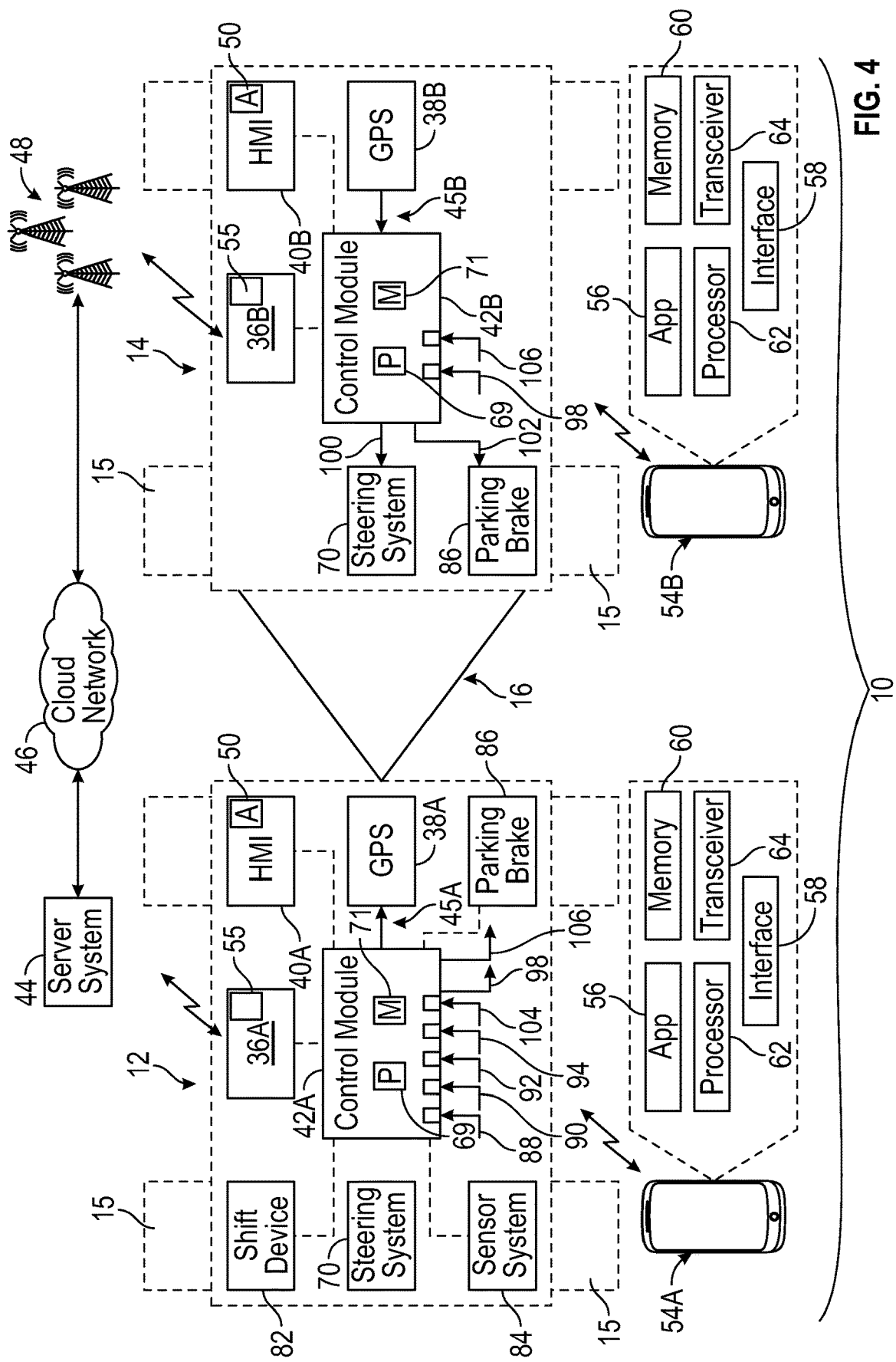
FIG. 4 schematically illustrates exemplary steering-related aspects of a vehicle-to-vehicle energy transfer system.

Additional functionality of the system 10 of FIGS. 1-3 is further detailed in FIG. 4. In particular, FIG. 4 schematically illustrates features that enable the system 10 to coordinate steering controls between the leading vehicle 12 and the trailing vehicle 14 for achieving more cohesive parking experiences during towing events. The steering controls may be coordinated during the towing event whether or not energy is concurrently being supplied from the leading vehicle 12 to the trailing vehicle 14 or from the trailing vehicle 14 to the leading vehicle 12.

In an embodiment, the system 10 includes components from both the leading vehicle 12 and the trailing vehicle 14. For example, the leading vehicle 12 may include a telecommunications module 36A, a global positioning system (GPS) 38A, a human machine interface (HMI) 40A, a shift device 82, a sensor system 84, and a control module 42A. These components may be interconnected and in electronic communication with one another over a communication bus 45A. The communication bus 45A may be a wired communication bus such as a controller area network (CAN) bus, or a wireless communication bus such as Wi-Fi, Bluetooth®, Ultra-Wide Band (UWB), etc.

As further part of the system 10, the trailing vehicle 14 may include a telecommunications module 36B, a global positioning system (GPS) 38B, a human machine interface (HMI) 40B, a parking brake 86, and a control module 42B. These components may be interconnected and in electronic communication with one another over a communication bus 45B. The communication bus 45B may be a wired communication bus such as a controller area network (CAN) bus, or a wireless communication bus such as Wi-Fi, Bluetooth®, Ultra-Wide Band (UWB), etc.

The telecommunications modules 36A, 36B may be configured for achieving bidirectional communications between the leading vehicle 12 and the trailing vehicle 14 over a cloud-based server system 44, such as for scheduling and executing in-flight vehicle-to-vehicle bidirectional energy transfers, for example. Each telecommunications module 36A, 36B may communicate over a cloud network 46 (i.e., the internet) to obtain various information stored on the server system 44 or to provide information to the server system 44 that can subsequently be accessed by the leading vehicle 12 and/or the trailing vehicle 14 (or other participating vehicles). The server system 44 can identify, collect, and store user data associated with both the leading vehicle 12 and the trailing vehicle 14 for validation purposes. Upon an authorized request, data may be subsequently transmitted to the telecommunications modules 36A, 36B via one or more cellular towers 48 or via some other known communication technique (e.g., Wi-Fi, Bluetooth®, data connectivity, etc.). The information can then be communicated to the control module 42A, 42B for further processing. Each telecommunications module 36A, 36B can receive data from the server system 44 or communicate data back to the server system 44 via the cellular tower(s) 48. Although not necessarily shown or described in this highly schematic embodiment, numerous other components may enable bidirectional communications between the vehicles 12, 14 via the server system 44.

In an embodiment, a user/owner of the leading vehicle 12 and/or the trailing vehicle 14 may interface with the server system 44 using the HMI 40A, 40B. For example, each HMI 40A, 40B may be equipped with an application 50 (e.g., FordPass™ or another similar application) for interfacing with the server system 44. Each HMI 40A, 40B may be located within a passenger cabin of its respective vehicle and may include various user interfaces for displaying information to the vehicle occupants and for allowing the vehicle occupants to enter information into the HMI 40A, 40B. The vehicle occupants may interact with the user interfaces via touch screens, tactile buttons, audible speech, speech synthesis, etc.

In another embodiment, the user/owner of the leading vehicle 12 and/or the trailing vehicle 14 could alternatively or additionally interface with the server system 44 using a personal electronic device 54A, 54B (e.g., a smart phone, tablet, computer, wearable smart device, etc.). Each personal electronic device 54A, 54B may include an application 56 (e.g., FordPass™ or another similar application) that includes programming to allow the user to employ one or more user interfaces 58 for setting or controlling certain aspects of the system 10. The application 56 may be stored in memory 60 of the personal electronic device 54A, 54B and may be executed by a processor 62 of the personal electronic device 54A, 54B. Each personal electronic device 54A, 54B may additionally include a transceiver 64 that is configured to communicate with the server system 44 over the cellular tower(s) 48 or some other wireless link.

Each telecommunications module 36A, 36B may additionally include one or more wireless devices 55 that facilitate the detection of and communication with nearby vehicles, such as the leading vehicle 12 or the trailing vehicle 14, for example. Various information and signals, including steering-related information and signals, may be exchanged between the leading vehicle 12 and the trailing vehicle 14 via the wireless devices 55. In an embodiment, the wireless devices 55 are Bluetooth® Low Energy (BLE) transceivers configured to receive and/or emit low energy signals as a way to detect and communicate with participating vehicles. However, other types of wireless devices (e.g., WiFi, V2V, etc.) are also contemplated within the scope of this disclosure for enabling bidirectional communication between the leading vehicle 12 and the trailing vehicle 14.

Each GPS 38A, 38B is configured to pinpoint an exact location of the leading vehicle 12 or trailing vehicle 14, such as by using satellite navigation techniques. In an embodiment, the location data from the GPS 38A and/or the GPS 38B may be utilized to aid in determining a road grade (e.g., downhill, uphill, flat, etc.) of the roadway 18 that the vehicles are operating on during the towing event. The road grade information may be helpful for determining the correct steering maneuvers to perform when parking, for example.

The shift device 82 may be located within a passenger compartment of the leading vehicle 12 and is generally used to change a gear of a transmission of the leading vehicle 12. For example, the shift device 82 may be used to shift the transmission into park (P), reverse (R), neutral (N), drive (D), low (L), etc. The shift device 82 could be a shift lever movable to change the gear or an electronic shift device that includes one or more joysticks, dials, and/or buttons for changing the gear.

The sensor system 84 may include a multitude of sensors and cameras adapted for monitoring the environment in and around the leading vehicle 12 and/or the trailing vehicle 14. In an embodiment, the sensor system 84 may be configured to sense a position of the shift device 82, such as for determining when the shift device 82 has been moved out of a drive gear and into the park (P) position, for example. In another embodiment, the sensor system 84 may be configured to estimate the road grade of the roadway 18, such as by using a gyroscope and/or accelerometers, for example. In yet another embodiment, the sensor system 84 may be configured to detect a curb, other vehicles (e.g., nearby traffic), and/or other objects near the leading vehicle 12 and/or the trailing vehicle 14, such as by using one or more cameras that are capable of monitoring the front, rear, and/or sides of the leading vehicle 12 and/or the trailing vehicle 14. The cameras of the sensor system 84 may be part of a 360 degree camera system, for example. Although not shown, the trailing vehicle 14 could also include a similarly equipped sensor system for assisting with monitoring the environment around the vehicles 12, 14.

The sensor system 84 described above is intended to be exemplary only and thus could include a greater or fewer number of sensors and/or different types of sensors than are specifically described. In addition, in this disclosure, any of the described sensors of the sensor system 84 could be configured as a single sensor or an arrangement of sensors or sensing devices adapted for specific purposes.

The control modules 42A, 42B may each include both hardware and software and could be part of an overall vehicle control system, such as a vehicle system controller (VSC), or could alternatively be a stand-alone controller separate from the VSC. In an embodiment, each control module 42A, 42B is programmed with executable instructions for interfacing with and commanding operation of various components of the system 10. Although shown as separate modules within the highly schematic depiction of FIG. 4, the telecommunications module, the GPS, the HMI, and the control module could be integrated together as part of common module within each of the leading vehicle 12 and the trailing vehicle 14.

Each control module 42A, 42B may include a processor 69 and non-transitory memory 71 for executing various control strategies and modes associated with the system 10. The processors 69 can be custom made or commercially available processors, central processing units (CPUs), or generally any device for executing software instructions. The memory 71 can include any one or combination of volatile memory elements and/or nonvolatile memory elements. The processor 69 may be operably coupled to the memory 71 and may be configured to execute one or more programs stored in the memory 71 of each control module 42A, 42B based on the various inputs received from other devices.

The control modules 42A, 42B may be configured to receive various inputs, analyze these inputs, and then command various steering-related operations of the system 10 when parking during a towing event. In an embodiment, the control module 42A of the leading vehicle 12 is adapted to receive a first input signal 88 from the shift device 82 or the sensor system 84. The first input signal 88 may indicate, for example, that the shift device 82 has been shifted to the park (P) position.

In another embodiment, the control module 42A of the leading vehicle 12 is adapted to receive a second input signal 90 from the sensor system 84. The second input signal 90 may indicate, for example, that a curb or traffic has been detected at either side of the leading vehicle 12. Together, the first input signal 88 and the second input signal 90 may be interpreted by the control module 42A as indicating that a parking event is likely occurring.

In another embodiment, the control module 42A is adapted to receive a third input signal 92 from the GPS 38A and/or the sensor system 84. The third input signal 92 may include road grade data concerning the roadway 18. The road grade data may be utilized to estimate a road grade of the roadway 18.

In yet another embodiment, the control module 42A is adapted to receive a fourth input signal 94 from the steering system 70. The fourth input signal 94 may include steering-related data associated with the leading vehicle 12. The steering-related data may include, but is not limited to, information such as yaw rate (e.g., rate of rotation of turn), steering wheel angle, vehicle weight, tire/wheelbase size, tire pressure, status of parking brake 86 (e.g., engaged/not engaged), distance from front to rear wheels, distance from rear tire to vehicle hitch, etc.

Figure 5A:
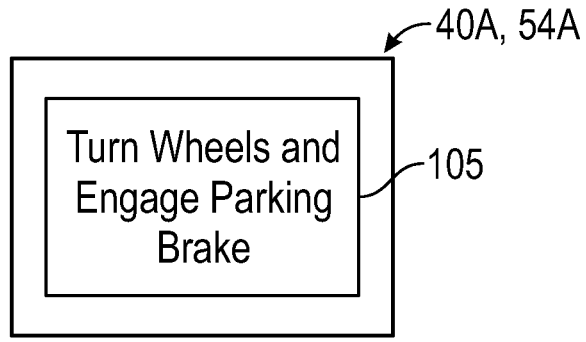
FIGS. 5A and 5B schematically illustrate exemplary message that may be provided to a user of a vehicle-to-vehicle energy transfer system when parking during a towing event.

Based on the various inputs, the control module 42A may command the display of a steering-related message 105 (see FIG. 5A) to the user of the leading vehicle 12 when parking during the towing event. The message 105 may be displayed on the HMI 40A, the personal electronic device 54A, or both. The message is designed to convey to the user the need to position the drive wheels 15 either toward or away from a detected curb or detected traffic, for example. The direction the drive wheels 15 are turned may depend on the detected road grade of the roadway 18, among other factors. The message 105 may further instruct the user to engage the parking brake 86 of the leading vehicle 12.

Once the drive wheels 15 of the leading vehicle 12 are positioned as desired for the given vehicle parking and towing conditions, the control module 42A may communicate (e.g., via the telecommunications modules 36A, 36B) a steering request signal 98 to the control module 42B of the trailing vehicle 14. The steering request signal 98 indicates to the trailing vehicle 14 that an assistive parking steering maneuver is required for achieving a more cohesive parking experience when parking during the towing event. Target steering data that may be derived from the steering-related data associated with the leading vehicle 12 may be included as part of the steering request signal 98.

In response to receiving the steering request signal 98, the control module 42B of the trailing vehicle 14 may communicate a steering command signal 100 to the steering system 70 of the trailing vehicle 14. The steering command signal 100 may include instructions for executing desired assistive parking steering maneuver for maneuvering the drive wheels 15 of the trailing vehicle 14. The instructed assistive parking steering maneuvers may include positioning the drive wheels 15 either in the same direction or the opposite direction as the drive wheels 15 of the leading vehicle 12, for example. In this way, the trailing vehicle 14 may be operated in coordination with the leading vehicle 12 in order to provide a towing steering system that steers the coupled vehicles as a single unit when parking during towing events.

In an embodiment, the steering command signal 100 may command the drive wheels 15 to a fully locked position. The fully locked position represents a position in which the drive wheels 15 have been turned to a maximum turning angle relative to a longitudinal axis of the trailing vehicle 14.

The control module 42B of the trailing vehicle 14 may additionally communicate a braking command signal 102 to the parking brake 86 in response to receiving the steering request signal 98. The parking brake 86 may be automatically engaged in response to receiving the braking command signal 102 in order to prevent unintended movement of the trailing vehicle 14 while parked. In an embodiment, the parking brake 86 is an electronic braking device that is capable of preventing movement of one or more of the drive wheels 15 when engaged.

Figure 5B:
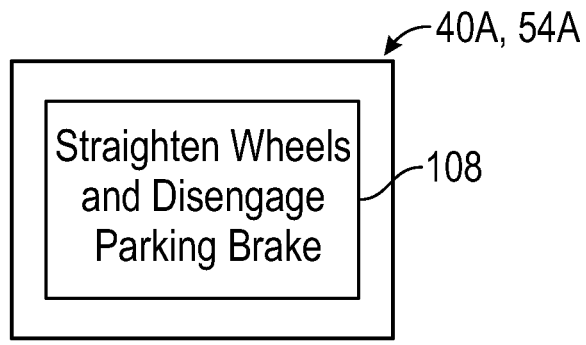

The control module 42A of the leading vehicle 12 may be further adapted to command the display of a reminder message 108 (see FIG. 5B) to the user of the leading vehicle 12 in response to receiving a fifth input signal 104. The fifth input signal 104 may indicate that the ignition of the leading vehicle 12 has been turned on, that the parking brake 86 of the leading vehicle 12 has been disengaged, or both. The reminder message 108 may be displayed on the HMI 40A, the personal electronic device MA, or both and is designed to convey to the user the need to straighten the drive wheels 15 and disengage the parking brake 86 before resuming the towing event by driving away from the current parking spot.

Subsequent to receiving the fifth input signal 104, the control module 42A of the leading vehicle 12 may communicate a steering request end signal 106 to the control module 42B of the trailing vehicle 14. The steering request end signal 106 indicates that the parking event has ended. In response to receiving the steering request end signal 106, the control module 42B may command the steering system 70 to straighten the drive wheels 15 of the trailing vehicle 14 and may command the parking brake 86 to disengage.

Figure 6:
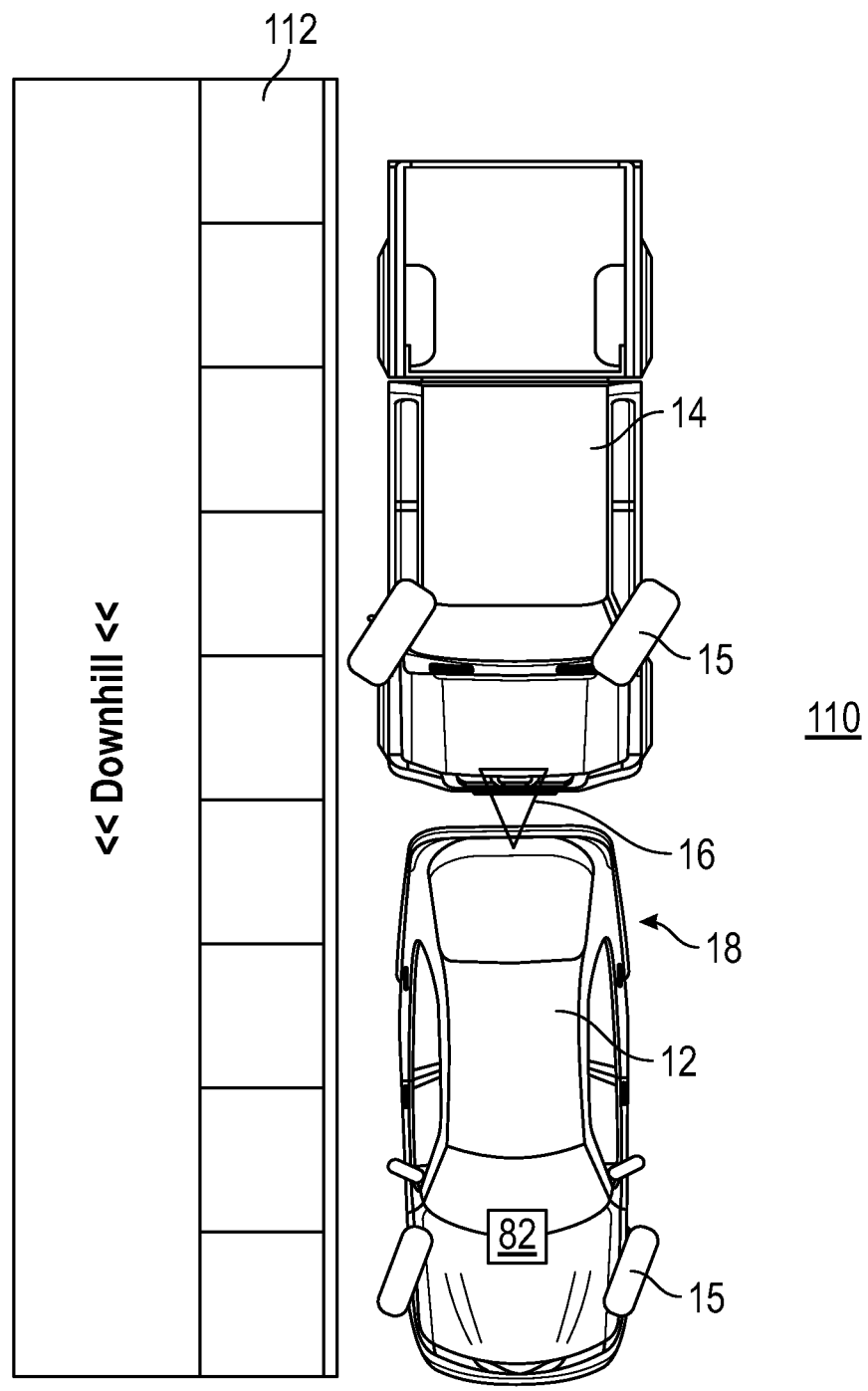
FIG. 6 schematically illustrates a first exemplary steering control use case that can be achieved via a vehicle-to-vehicle energy transfer system.

The steering controls of the leading vehicle 12 and the trailing vehicle 14 may be coordinated via the system 10 to accommodate various steering-related use cases when parking during towing events. A first exemplary use case 110 of the system 10 is schematically illustrated in FIG. 6. The first use case 110 assumes that the vehicles 12, 14 are preparing to park on a downhill grade of the roadway 18, a curb 112 has been detected at either side of the vehicles 12, 14, and the shift device 82 of the leading vehicle 12 has been moved to the park (P) position. If each of these conditions is met, the drive wheels 15 of both the leading vehicle 12 and the trailing vehicle 14 are instructed/commanded to be turned in a direction toward the curb 112. Thus, the coupled vehicles 12, 14 will roll toward the curb 112 if any unintended movement should occur while parked.

Figure 7:
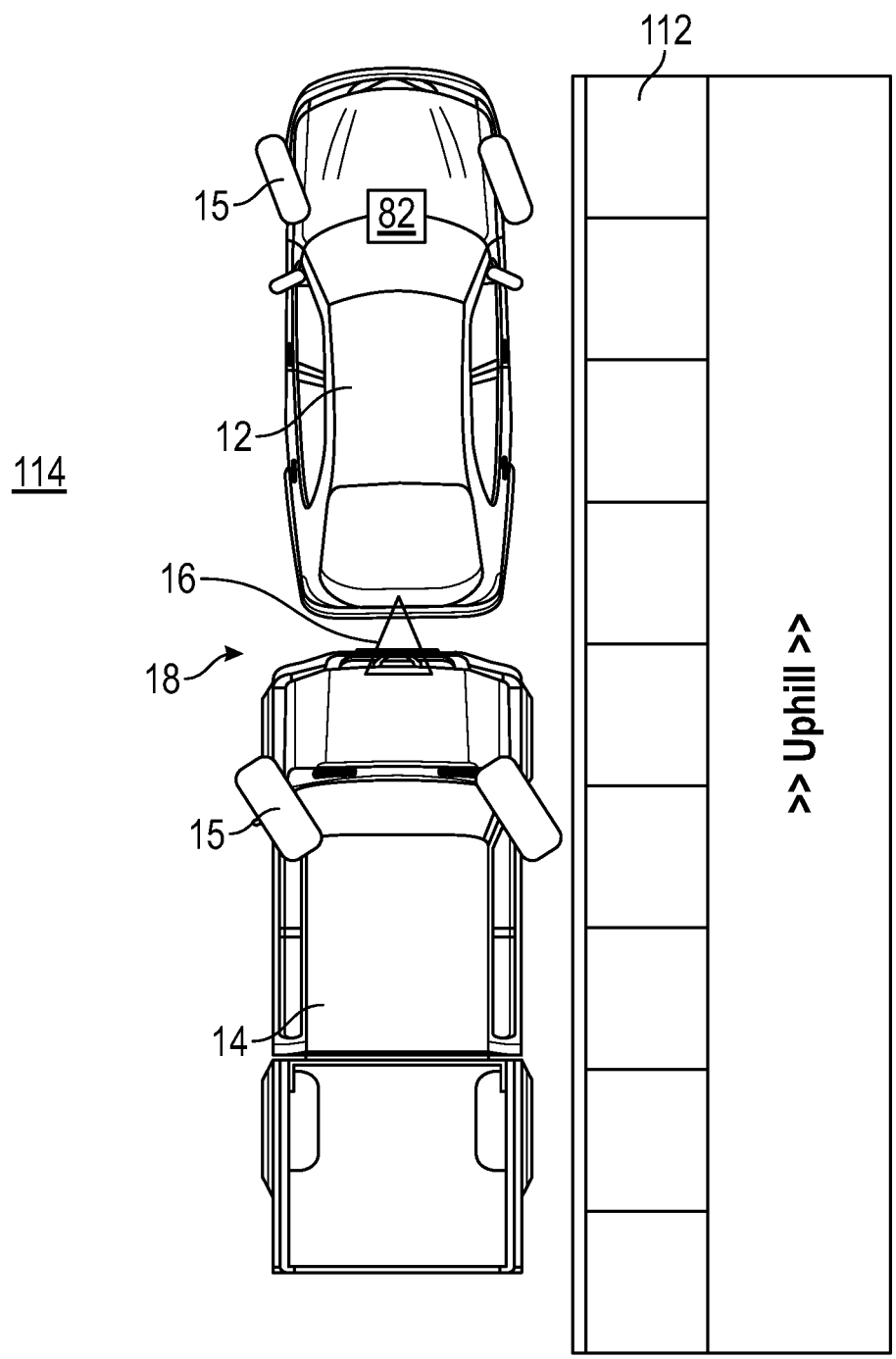
FIG. 7 schematically illustrates a second exemplary steering control use case that can be achieved via a vehicle-to-vehicle energy transfer system.

A second exemplary use case 114 of the system 10 is schematically illustrated in FIG. 7. The second use case 114 assumes that the vehicles 12, 14 are preparing to park on an uphill grade of the roadway 18, a curb 112 has been detected at either side of the vehicles 12, 14, and the shift device 82 of the leading vehicle 12 has been moved to the park (P) position. If each of these conditions is met, the drive wheels 15 of both the leading vehicle 12 and the trailing vehicle 14 are instructed/commanded to be turned in a direction away from the curb 112. Thus, the coupled vehicles 12, 14 will roll toward the curb 112 if any unintended movement should occur while parked.

Figure 8:
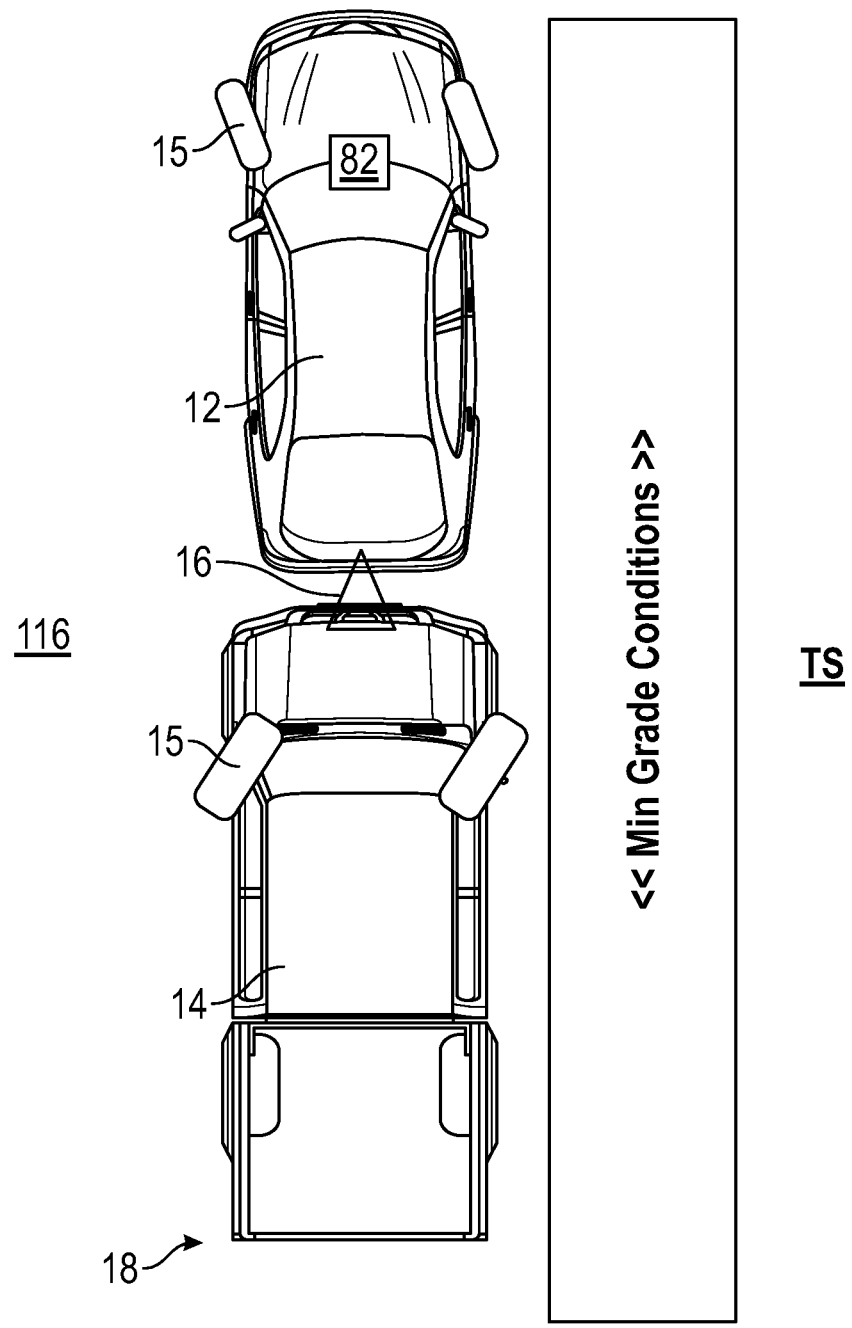
FIG. 8 schematically illustrates a third exemplary steering control use case that can be achieved via a vehicle-to-vehicle energy transfer system.

A third exemplary use case 116 of the system 10 is schematically illustrated in FIG. 8. The third use case 116 assumes that the vehicles 12, 14 are preparing to park on a minimal grade (e.g., about 2 degrees or less) of the roadway 18, the traffic side of the vehicles has been determined (e.g., traffic is detected either to the left or to the right of the vehicles 12, 14), and the shift device 82 of the leading vehicle 12 has been moved to the park (P) position. If each of these conditions is met, the user of the leading vehicle 12 is instructed to point the drive wheels 15 of the leading vehicle 12 in a direction away from a traffic side TS of the vehicles 12, 14, and the drive wheels 15 of the trailing vehicle 14 are commanded to be turned in a direction opposite from the drive wheels 15 of the leading vehicle 12. Stated another way, the respective drive wheels 15 of the vehicles 12, 14 are positioned in opposite directions for minimal grade conditions of the roadway 18.

Figure 9:
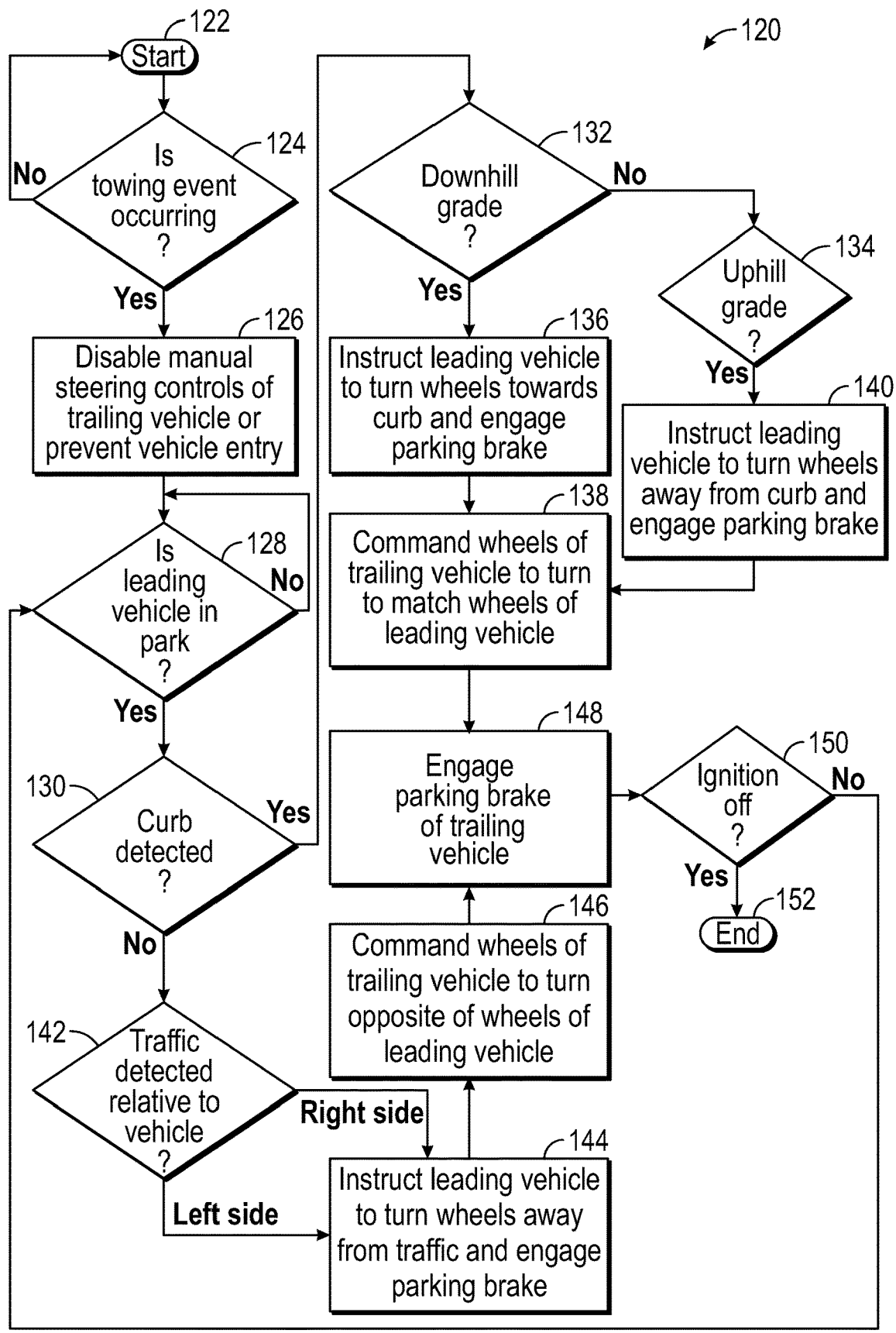
FIG. 9 is a flow chart of an exemplary method for coordinating steering controls of a towing vehicle and a towed vehicle when parking during towing events.

FIG. 9, with continued reference to FIGS. 1-8, schematically illustrates in flow chart form an exemplary method 120 for coordinating the steering controls of the leading vehicle 12 and the trailing vehicle 14 of the system 10 when parking during towing events in which the leading vehicle 12 is towing the trailing vehicle 14. The system 10 may be configured to employ one or more algorithms adapted to execute the steps of the exemplary method 120. For example, the method 120 may be stored as executable instructions in the memory 71 of each control module 42A, 42B, and the executable instructions may be embodied within any computer readable medium that can be executed by the processor 69 of each of the control modules 42A, 42B.

The exemplary method 120 may begin at block 122. At block 124, the method 120 may determine whether the leading vehicle 12 and the trailing vehicle 14 are engaged in a towing event. In an embodiment, the towing event is an in-flight bidirectional charging towing event in which the leading vehicle 12 and the trailing vehicle are connected by the towing device 16 and are further operably connected for achieving the bi-directional transfer of energy. It is noted, however, that energy does not need to be transferred continuously between the vehicles 12, 14 in order for the method 120 to be executed. Stated another way, there may be situations in which it is beneficial to coordinate the steering controls of the leading vehicle 12 and the trailing vehicle 14 during the towing event even though energy is not currently being transferred between the respective vehicles for charging purposes.

If a YES flag is returned at block 124, the method 120 may optionally proceed to block 126 by disabling the manual steering controls of the trailing vehicle 14. Disabling the manual steering controls of the trailing vehicle 14 prevents a user of the trailing vehicle 14 from steering the vehicle 14 during the towing event. The manual steering controls of the trailing vehicle 14 may be re-enabled once the trailing vehicle 14 is decoupled from the leading vehicle 12 upon completion of the towing event. Alternatively, entry to the trailing vehicle 14 may optionally be prevented at block 126.

Next, at block 128, the method 120 may determine whether the shift device 82 of the leading vehicle 12 is in park (P). If the leading vehicle 12 is parked, the method 120 may then determine whether a curb has been detected at block 130. If YES, the method 120 may determine whether the road grade of the roadway 18 is a downhill grade at block 132 or an uphill grade at block 134.

If a downhill grade of the roadway 18 is detected at block 132, the method 120 may proceed to block 136. At this step, the method 120 may instruct the operator of the leading vehicle 12 to turn the drive wheels 15 of the leading vehicle 12 toward the curb 112 and engage the parking brake 86 (e.g., by displaying the message 105 of FIG. 5A or a similar message). The method 120 may then command the drive wheels 15 of the trailing vehicle 14 to turn to a position that matches the drive wheels 15 of the leading vehicle 12 at block 138.

If an uphill grade of the roadway 18 is detected at block 134, the method 120 may proceed to block 140. At this step, the method 120 may instruct the operator of the leading vehicle 12 to turn the drive wheels 15 of the leading vehicle 12 away from the curb 112 and engage the parking brake 86 (e.g., by displaying the message of FIG. 5A or a similar message). The method 120 may then command the drive wheels 15 of the trailing vehicle 14 to turn to a position that matches the drive wheels 15 of the leading vehicle 12 at block 138.

Alternatively, if a curb is not detected at block 130, the method 120 may proceed to block 142 by determining a traffic side of the vehicles 12, 14 (e.g., the side facing toward other vehicles driving past the vehicles 12, 14 during the parking event). The method 120 then instructs the leading vehicle 12 to turn the drive wheels 15 in a direction away from the traffic and engage the parking brake 86 at block 144 (e.g., by displaying the message of FIG. 5A or a similar message). The method 120 may then command the drive wheels 15 of the trailing vehicle 14 to turn to a position opposite of the drive wheels 15 of the leading vehicle 12 at block 146.

From either block 138 or block 146, the method 120 may command the parking brake 86 of the trailing vehicle 14 to engage at block 148. The method 120 may then determine whether the ignition of the leading vehicle 12 is turned off at block 150. The method 120 may end at bock 152 if the ignition is turned off. Otherwise, the method 120 may return to block 128 for continuing to monitor the parking status during the towing event.

The vehicle-to-vehicle (V2V) in-flight energy transfer systems of this disclosure are designed to provide bidirectional charging while the participating vehicles are making forward progress toward their respective destinations. The systems are further configured to provide coordinated steering controls of the coupled vehicles when parking during the towing event. The coordinated steering controls between the leading and trailing vehicles allow the trailing vehicle to seamlessly match/compensate the turning output of the leading vehicle instead of as separate units for providing more cohesive parking experiences.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle-to-vehicle in-flight energy transfer system, comprising:
    a towing vehicle;
    a towed vehicle;
    a towing device that mechanically connects the towed vehicle and the towing vehicle to allow the towing vehicle to pull the towed vehicle during a towing event; and
    a control module programmed to coordinate parking steering maneuvers of the towing vehicle and the towed vehicle when parking during the towing event between the towing vehicle and the towed vehicle;
    wherein, as part of coordinating the parking steering maneuvers, the control module is programmed to:
        coordinate a first steering-related use case configured to:
            instruct a user of the towing vehicle to turn a first set of drive wheels in a first direction toward a curb when parking on a downhill grade of a roadway; and
            command the towed vehicle to turn a second set of drive wheels of the towed vehicle in the first direction toward a curb; or
        coordinate a second steering-related use case configured to:
            instruct the user of the towing vehicle to turn the first set of drive wheels in a second direction away from the curb when parking on an uphill grade of the roadway; and
            command the towed vehicle to turn the second set of drive wheels of the towed vehicle in the second direction away from the curb; or
        coordinate a third steering-related use case configured to:
            instruct the user of the towing vehicle to turn the first set of drive wheels in a third direction away from a traffic side of the towing vehicle when parking on a minimal grade of the roadway; and
            command the towed vehicle to turn the second set of drive wheels of the towed vehicle in a fourth direction that is opposite of the third direction.

2. The system as recited in claim 1, wherein the towing vehicle is a smaller vehicle than the towed vehicle.

3. The system as recited in claim 1, wherein the towing event is an in-flight bidirectional charging towing event.

4. The system as recited in claim 1, wherein the control module is a component of the towing vehicle.

5. The system as recited in claim 1, wherein the control module is programmed to transmit a steering request signal to the towed vehicle when parking during the towing event.

6. The system as recited in claim 5, wherein the steering request signal includes steering-related data associated with the towing vehicle for instructing the towed vehicle to match a drive wheel turn direction of the towing vehicle.

7. The system as recited in claim 6, wherein the steering-related data includes at least a yaw rate and a steering wheel angle of the towing vehicle.

8. The system as recited in claim 1, wherein the control module is programmed to command the towed vehicle to engage a parking brake when parking during the towing event.

9. The system as recited in claim 1, wherein the control module is programmed to analyze inputs from a shift device, a sensor system, a global positioning system (GPS), and a steering system of the towing vehicle for coordinating the parking steering maneuvers.

10. The system as recited in claim 1, wherein the towing vehicle and the towed vehicle are both either a battery electric vehicle (BEV) or a plug-in hybrid battery electric vehicle (PHEV).

11. The system as recited in claim 10, wherein the towing vehicle and the towed vehicle are both passenger vehicles.

12. The system as recited in claim 7, wherein the steering-related data includes at least a vehicle weight, a tire/wheelbase size, a tire pressure, and a distance from front to rear wheels of the towing vehicle.

13. The system as recited in claim 5, wherein the steering request signal includes an instruction for commanding a set of drive wheels of the towed vehicle to a fully locked position.

14. The system as recited in claim 13, wherein the fully locked position is a position in which the set of drive wheels of the towed vehicle is turned to a maximum angle relative to a longitudinal axis of the towed vehicle.

15. A method, comprising:
    during a towing event in which a towing vehicle is towing a towed vehicle, controlling the towed vehicle to provide a parking steering maneuver when parking the towed vehicle and the towing vehicle during the towing event,
    wherein the towing vehicle and the towed vehicle are mechanically connected by a towing device to allow the towing vehicle to pull the towed vehicle during the towing event;
    wherein, as part of the parking steering maneuver, the method is configured to:
        coordinate a first steering-related use case configured to:
            instruct a user of the towing vehicle to turn a first set of drive wheels in a first direction toward a curb when parking on a downhill grade of a roadway; and
            command the towed vehicle to turn a second set of drive wheels of the towed vehicle in the first direction toward a curb; or
        coordinate a second steering-related use case configured to:

instruct the user of the towing vehicle to turn the first set of drive wheels in a second direction away from the curb when parking on an uphill grade of the roadway; and command the towed vehicle to turn the second set of drive wheels of the towed vehicle in the second direction away from the curb; or coordinate a third steering-related use case configured to:

instruct the user of the towing vehicle to turn the first set of drive wheels in a third direction away from a traffic side of the towing vehicle when parking on a minimal grade of the roadway; and command the towed vehicle to turn the second set of drive wheels of the towed vehicle in a fourth direction that is opposite of the third direction.

16. A vehicle-to-vehicle in-flight energy transfer system, comprising:

a towing vehicle;

a towed vehicle;

a towing device that mechanically connects the towed vehicle and the towing vehicle to allow the towing vehicle to pull the towed vehicle during a towing event; and a control module programmed to coordinate parking steering maneuvers for achieving a coupled movement of the towing vehicle and the towed vehicle when parking during the towing event, wherein the control module is programmed to transmit a steering request signal to the towed vehicle during the parking, wherein the steering request signal includes steering-related data associated with the towing vehicle for instructing the towed vehicle to match a drive wheel turn direction of the towing vehicle;

wherein, as part of the coordinating the parking steering maneuvers, the control module is programed to:

coordinate a first steering-related use case configured to:

instruct a user of the towing vehicle to turn a first set of drive wheels in a first direction toward a curb when parking on a downhill grade of a roadway; and command the towed vehicle to turn a second set of drive wheels of the towed vehicle in the first direction toward a curb; or coordinate a second steering-related use case configured to:

instruct the user of the towing vehicle to turn the first set of drive wheels in a second direction away from the curb when parking on an uphill grade of the roadway; and command the towed vehicle to turn the second set of drive wheels of the towed vehicle in the second direction away from the curb.

* * * * *